United States Patent [19]
Loubier et al.

[11] Patent Number: 5,528,091
[45] Date of Patent: Jun. 18, 1996

[54] SWING-TYPE ACTUATOR AND DEVICE FOR LOCATING TERMINAL PINS RELATIVE TO COIL FOR SAME

[75] Inventors: Robert J. Loubier, Roanoke; Kevin E. Heimann, Fort Wayne, both of Ind.

[73] Assignee: Xolox Corporation, Fort Wayne, Ind.

[21] Appl. No.: 243,476

[22] Filed: May 16, 1994

[51] Int. Cl.[6] .............................. H02K 33/00; G11B 5/54
[52] U.S. Cl. ................................ 310/13; 360/106
[58] Field of Search ............................ 310/43, 71, 13, 310/15; 360/104, 105, 106

[56] References Cited

U.S. PATENT DOCUMENTS

| | | | |
|---|---|---|---|
| 2,137,392 | 11/1938 | Cobb | 336/135 |
| 2,511,897 | 6/1950 | Booth | 336/205 |
| 3,525,966 | 8/1970 | Wierzbinski | 336/205 |
| 3,634,878 | 1/1972 | Davis | 336/192 |
| 4,075,273 | 2/1978 | Liautaud | 264/250 |
| 4,102,973 | 7/1978 | Hanning | 264/272 |
| 4,164,675 | 8/1979 | Sato et al. | 310/268 |
| 4,193,185 | 3/1980 | Liautaud | 29/605 |
| 4,264,675 | 4/1981 | Liautaud | 428/376 |
| 4,728,916 | 3/1988 | Fontecchio et al. | 335/255 |
| 4,763,095 | 8/1988 | Bradt | 336/96 |
| 4,853,575 | 8/1989 | Lessig, III | 310/171 |
| 4,879,617 | 11/1989 | Sampietro et al. | 360/106 |
| 4,931,728 | 6/1990 | Hata et al. | 336/192 X |
| 5,034,837 | 7/1991 | Schmitz | 360/105 |
| 5,100,311 | 3/1992 | Clemens et al. | 336/196 X |
| 5,122,703 | 6/1992 | Takahashi et al. | 310/36 |
| 5,382,851 | 1/1995 | Loubier | 310/13 |

*Primary Examiner*—Steven L. Stephan
*Assistant Examiner*—Judson H. Jones
*Attorney, Agent, or Firm*—Barnes & Thornburg

[57] ABSTRACT

A device for locating terminal pins relative to a swing-type actuator coil includes a body, a pair of terminal pin sleeves and a bridge member joining the body and the sleeves. The body has an outer circumference less than the inner circumference of the coil, so as to allow the body to be press-fit within the coil. The body has a thickness less than the thickness of the coil. The body has an opening for locating the device in a mold while joining the body and coil to an actuator arm by injection molding a hold member about a portion of the coil, device and arm. The body further includes features for preventing the device from assuming a skewed orientation in the mold. The thickness of the projections is equal to the difference in thickness between the body and the coil. During the molding process, a portion of the hold member is formed adjacent the body on the interior of the coil and is flush with the projections. In this manner, the coil is secured to the body and the arm.

29 Claims, 3 Drawing Sheets

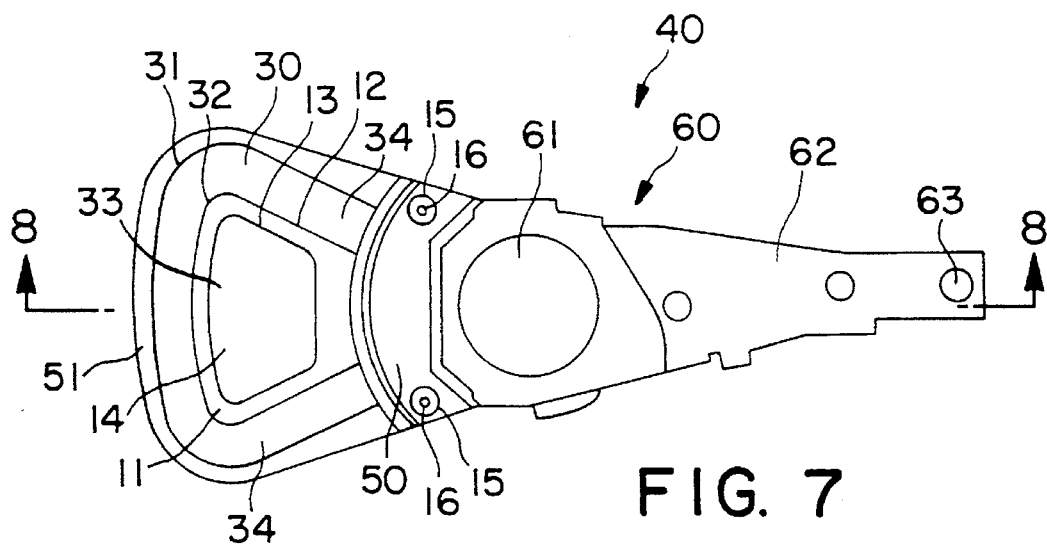
FIG. 7
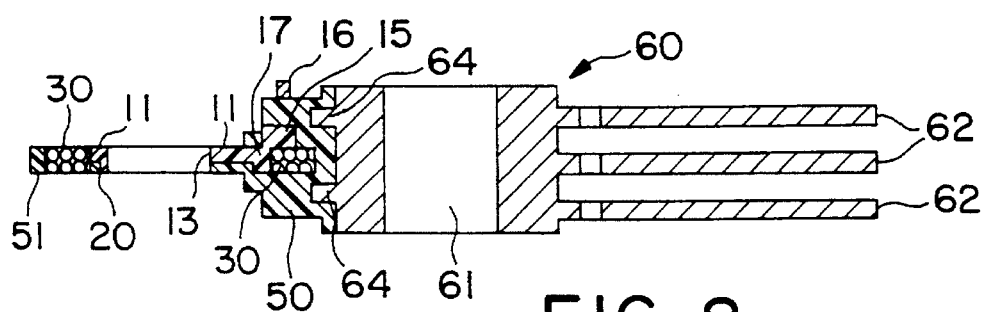
FIG. 8
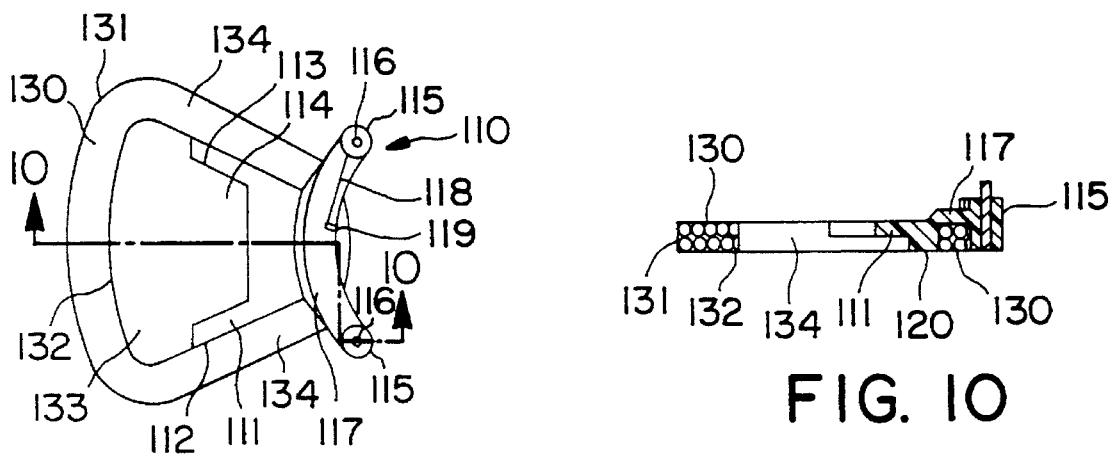
FIG. 9
FIG. 10

SWING-TYPE ACTUATOR AND DEVICE FOR LOCATING TERMINAL PINS RELATIVE TO COIL FOR SAME

BACKGROUND AND SUMMARY OF THE INVENTION

The present invention relates to swing-type actuators for disk drive assemblies and, more particularly, to a device for locating and securing terminal pins in a mold relative to a coil prior to an injection molding step in the manufacture of swing-type actuators.

Numerous swing-type actuators are known in the prior art. Typically, such actuators include an arm joined to a coil. A read/write head is mounted to the arm for reading data from and writing data to a computer disk. The arm is typically mounted about a shaft around which it rotates. The coil is disposed in a magnetic field. Lead wires from the coil are joined to terminal pins. When current is applied to the coil via the terminal pins, a magnetic field is set up about the coil. This causes the coil to move in the field in which it is already located. As the coil moves, the arm attached thereto also moves, thereby positioning the read/write head on the disk.

In the above described actuator, the coil may be attached to the arm of the actuator by means of a molded thermoplastic member. To do so, the coil, terminal pins and arm are placed in a mold. The mold is then injected with a thermoplastic material that surrounds at least part of the coil, terminal pins and arm. After the thermoplastic material sets, the completed actuator is removed from the mold.

Although the above described method of manufacturing an actuator is acceptable, it sometimes results in improper placement of the terminal pins relative to the coil. This may result from movement of the coil, terminal pins or both during the molding process. Additionally, the lead wires from the coil may "float" in the thermoplastic material during molding. If the wires come in contact during molding and remain that way after the thermoplastic material sets, the resulting short makes the actuator useless. Additionally, the lead wires may be stressed during the molding process by the flow of the thermoplastic material. This can result in broken lead wires.

It is an object of the present invention to provide a device for locating and securing terminal pins in a mold relative to a coil prior to an injection molding step in a manufacturing process.

Another object of the present invention is to provide means for attaching a coil to a swing-type actuator that prevents the lead wires of the coil from developing a short during manufacture.

Yet another object of the present invention is to provide means for reducing stress on the lead wires of a swing-type actuator coil during manufacture.

These and other objects of the present invention are attained by the provision of a device including a body formed to be disposed adjacent a surface of the coil, a plurality of terminal pin sleeves and a bridge member joining the body and the sleeves. In one embodiment of the invention, the body is disposed adjacent an inner circumferential surface of the coil, and the outer circumference of the body is smaller than the inner circumference of the coil such that the body may be press-fit within the coil. At least a portion of the body has a thickness less than the thickness of the coil.

According to another embodiment of the invention, the device includes means for locating the device in a mold. The means for locating the device in a mold may include at least one projection on the body.

The bridge member may also include means for reducing the stress on the coil lead wires during a molding process. The means may include a raised wire guide on the bridge member and a slot in the bridge member.

In one embodiment of the invention, the body extends completely around the interior circumference of the coil.

In yet another embodiment of the present invention, the body is a slotted coil retention member that receives a portion of the coil. The bridge member is thinner than the body and is disposed in substantially the same plane as the coil.

Other objects, advantages and novel features of the present invention will become apparent from the following detailed description of the invention when considered in conjunction with the accompanying drawings.

BRIEF DESCRIPTION OF DRAWINGS

FIG. 7 is a top plan view of a swing-type actuator having a coil attached thereto and utilizing the device shown in FIG. 1.

FIG. 8 is a cross-sectional view taken along line 8—8 in FIG. 7.

FIG. 9 is a top plan view of another embodiment of a device constructed according to the present invention.

FIG. 10 is a cross-sectional view taken along line 10—10 in FIG. 9.

DETAILED DESCRIPTION OF THE PREFERRED EMBODIMENTS

Figure 1:
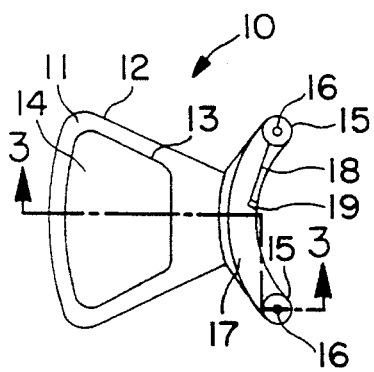
FIG. 1 is a top plan view of a device constructed according to the present invention.
Figure 2:
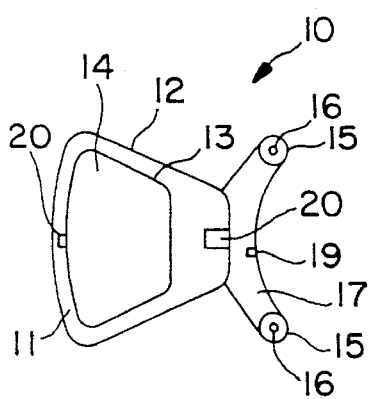
FIG. 2 is a bottom plan view of the device shown in FIG. 1.
Figure 3:
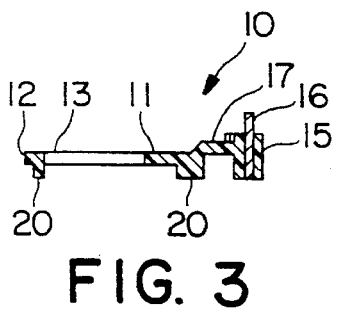
FIG. 3 is a cross-sectional view taken along line 3—3 in FIG. 1.

FIG. 1 shows a top plan view of a device 10 for locating terminal pins relative to a swing-type actuator coil according to the present invention. Device 10 generally includes body 11, terminal sleeves 15 and bridge member 17. Body 11 has an outer circumference 12 and an inner circumference 13 defining an opening 14. Terminal sleeves 15 are generally cylindrical members having electrically conductive terminal pins 16 disposed therein. Bridge member 17 integrally joins body 11 and terminal sleeves 15. Bridge member 17 includes a raised wire guide 18 formed on one surface thereof and further includes a slot 19 disposed at one end of wire guide 18. Device 10 further includes features, such as a pair of projections 20, on the bottom surface of body 11 (FIG. 2). As can be seen in FIG. 3, bridge member 17 extends above and behind body 11.

Figure 4:
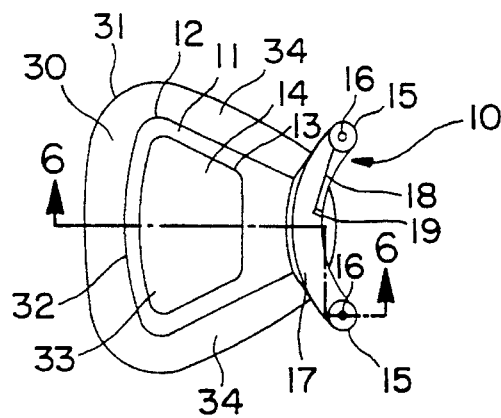
FIG. 4 is a top plan view of the device shown in FIG. 1 with a swing-type actuator coil attached thereto.
Figure 6:
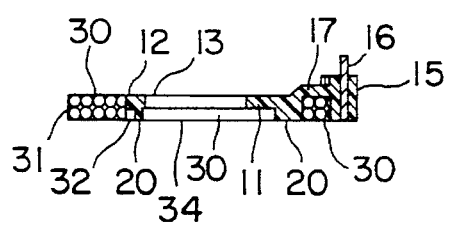
FIG. 6 is a cross-sectional view taken along line 6—6 in FIG. 4.

FIG. 4 shows a top plan view of the device shown in FIG. 1 with a swing-type actuator coil attached thereto. Coil 30 has an outer circumference 31 and an inner circumference 32 defining a central opening 33. Coil 30 further includes two straight segments 34. Coil 30 is preferably wound separately on mandrel and is preferably fabricated from copper wire. Inner circumference 32 of coil 30 is larger than outer circumference 12 of body 11. Accordingly, coil 30 may be initially secured to device 10 by press fitting body 11 into central opening 33 of coil 30. In this manner, a portion of coil 30 passes under bridge member 17 between terminal sleeves 15 and body 11 (FIG. 6). Note that body 11 has a thickness less than the thickness of coil 30 and that protrusions 20 on body 11 are equal to the difference in thickness between body 11 and coil 30.

After press fitting coil 30 around body 11, one lead wire (not shown) of coil 30 is disposed within slot 19, around wire guide 18 and is attached to the terminal pin 16 nearest wire guide 18. A second lead wire (not shown) is wrapped around a portion of bridge member 17 adjacent the other terminal sleeve 15 and attached to the terminal pin 16 disposed therein.

FIG. 7 shows a swing-type actuator 40 incorporating the present invention. Actuator 40 includes arm 60 joined to coil 30 and device 10 by hold member 50. Arm 60 is of a type commonly known in the industry, and may be suitable for use with single or multiple read/write heads. When used with multiple heads (i.e., as illustrated in FIGS. 7 and 8), this component is often referred to as an "E-block." E-blocks are commonly (but not exclusively) made of a light, strong metal, such as an aluminum or magnesium alloy. Arm 60 includes an opening 61 therein for mounting actuator 40 for pivotal movement, as is commonly known in the industry.

Arm 60 includes a plurality of read/write head carrying portions, designated carriers 62 below and in FIG. 7. Each read/write head carrier 62 is provided with a mounting hole 63 for attaching read/write heads thereto, as is commonly known in the art. Hold member 50 attaches to device 10 and coil 30 to one end of arm 60, as illustrated. Hold member 50 encompasses bridge member 17 and terminal sleeves 15, and a portion 51 of hold member 50 surrounds coil 30.

Figure 5:
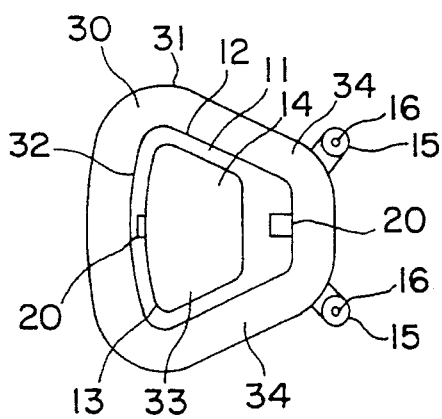
FIG. 5 is a bottom plan view of the device as shown in FIG. 4.

To attach coil 30 and device 10 to arm 60, device 10, with coil 30 press-fit thereon, is first placed in a mold. Opening 14 works in conjunction with a projection in the mold to properly locate device 10 in the mold. Protrusions 20 on body 11 engage the mold and prevent device 10 from assuming a skewed orientation. The thickness of body 11 as measured through projections 20 is the same as that of coil 30. When device 10 and coil 30 are placed in the mold and the mold is closed, the outwardly facing surfaces (visible in FIGS. 2 and 5) of projections 20 engage an adjacent surface of the mold to firmly position device 10 in the mold cavity.

Prior to closing the mold, arm 60 is positioned in the cavity. Thermoplastic resin is then injected into the mold to form hold member 50. This may best be seen in FIG. 8. As shown in that figure, hold member 50 surrounds fingers 64 of arm 60 to provide stronger attachment thereto. Hold member 50 further surrounds a portion of coil 30 and terminal sleeves 15, and overlaps the outer edge of bridge member 17. The angle of bridge member 17 and its spacing are preferably such that as little of hold member 50 as possible encroaches on straight segments 34 of coil 30. This is because straight segments 34 are the torque producing portions of coil 30. Thus, it is desirable to leave as much of straight segments 34 exposed to the magnetic field as possible. Note also from FIG. 8 that hold member 50 extends below body 11 and fills the difference in thickness between body 11 and coil 30 within opening 33 such that hold member 50 is flush with protrusions 20 on body 11. As previously discussed, the central opening in coil 30 is larger than the outer perimeter 12 of body 11. Thus, coil 30 may be press-fit around body 11. However, during the molding process, hold member 50 is formed tightly against inside circumference 32 of coil 30, thereby tightly securing coil 30 to body 11.

FIGS. 9 and 10 show another embodiment of the present invention. In FIGS. 9 and 10, the numeral "1" has been added to show correspondence with like elements in the prior embodiment. Thus, as can be seen in FIGS. 9 and 10, this embodiment utilizes a truncated body 111. As previously discussed, coil 130 is preferably wound on a mandrel, rather than on body 111. Thus, it is not necessary that body 111 extend the entire interior circumference 132 of coil 130. Rather, less than a complete body 111 may be utilized without impairing the function of device 110, namely, locating terminal pins 116 relative to coil 130.

Figure 11:
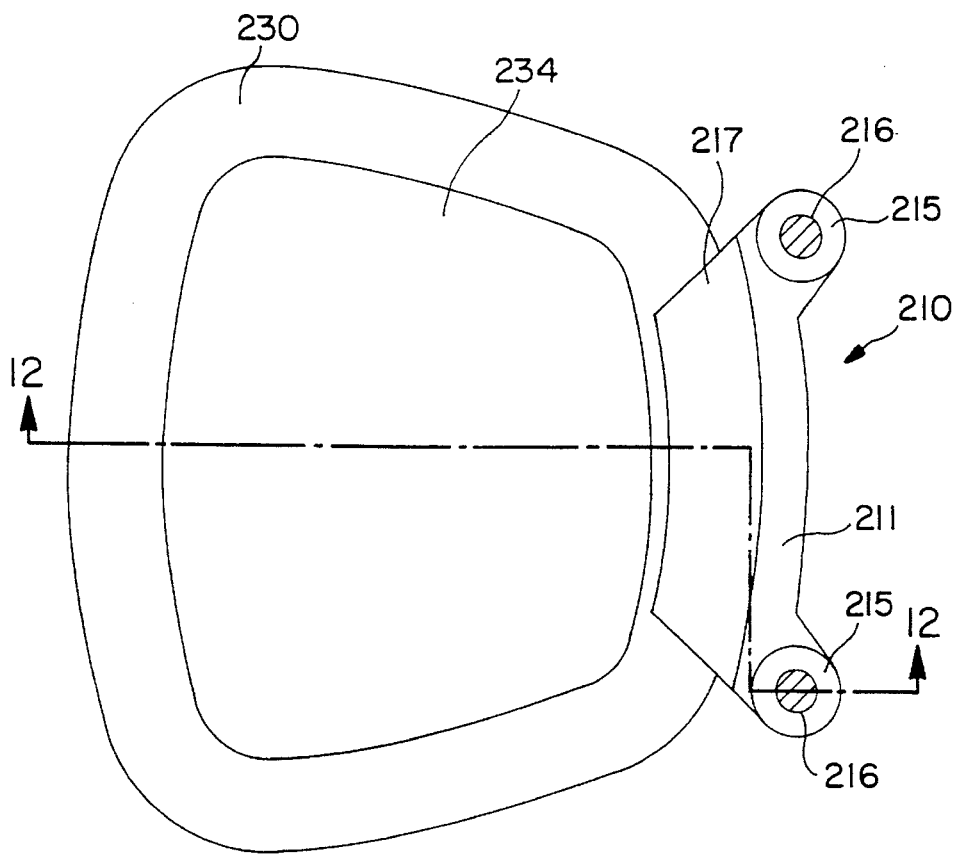
FIG. 11 is a top plan view of another embodiment of a device constructed according to the present invention.
Figure 12:
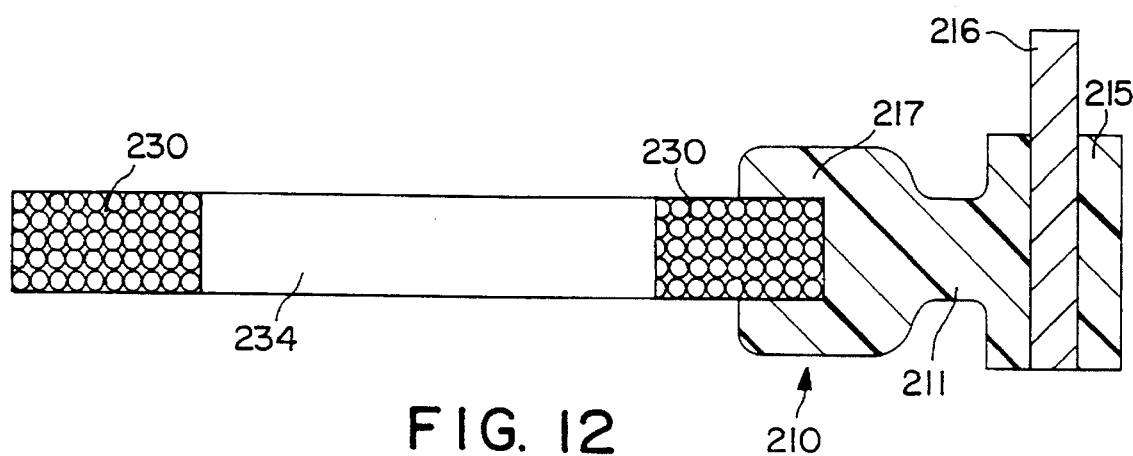
FIG. 12 is a cross-sectional view taken along line 12—12 in FIG. 11.

FIGS. 11 and 12 show another embodiment of the present invention, wherein the numeral "2" has been added before the remainder of the designation to indicate corresponding elements with the prior embodiments. In this embodiment, body 11 takes the form of a slotted coil retention member 211 that grips coil 230 and holds it in the proper position relative to terminal pins 216.

Although the invention has been described and illustrated in detail, it is to be clearly understood that the same is by way of illustration and example only and is not to be taken by way of limitation. Numerous variations may be made to the embodiments described above without departing from the scope of the invention. For example, various types of arms 60 and hold members 50 other than the one described above may be utilized. For example, swing-type actuator arms such as those shown in U.S. Pat. No. 5,168,184 to Umehara, et al., could also be utilized in conjunction with the present invention. Similarly, both hold member 50 and arm 60 could be formed of molded thermoplastic resin. Also, although the embodiment described above uses opening 14 to locate device 10 and coil 30 in the mold, other means may also be utilized. For example, device 10 could be provided with positioning holes that engage posts in the mold. Such features could also prevent device 10 from assuming a skewed orientation in the mold and allow protrusions 20 to be eliminated. Additionally, although coil 30 is preferably wound separately on a mandrel and then press fit around body 11, coil 30 could also be wound directly on body 11. Accordingly, the spirit and scope of the invention are limited only by the terms of the claims appended hereto.

What is claimed is:

1. A device for locating and securing terminal pins in a mold relative to a coil of a swing-type actuator for the read/write head of a disk drive, comprising:

a body disposed adjacent a surface of a coil of a swing-type actuator;

a plurality of terminal pin sleeves for receiving and securing respective terminal pins, said terminal pin sleeves being spaced apart from said body; and a bridge member extending between said body and said terminal pin sleeves to locate said terminal pins relative to the coil.

2. The device according to claim 1, wherein a portion of said body has a thickness which is less than the thickness of the coil.

3. The device according to claim 2, further including means for locating said body in a mold adjacent said surface of the coil.

4. The device according to claim 3, wherein said means for locating said body in the mold comprises at least one opening formed in said body.

5. The device according to claim 4, further including means for preventing the device from assuming a skewed orientation in the mold.

6. The device according to claim 5, wherein said means for preventing the device from assuming a skewed orientation in the mold comprises at least one structural feature formed on said body.

7. The device according to claim 6, wherein said structural feature is formed on said portion of said body having a thickness less than the thickness of the coil and is disposed between a surface of said body and a surface of the mold.

8. The device according to claim 1, wherein the body is disposed adjacent an inner circumferential surface of the coil, and wherein an outer circumference of said body is smaller than an inner circumference of the coil.

9. The device according to claim 8, wherein said body extends completely around the inner circumference of the coil.

10. The device according to claim 1, wherein the coil has lead wires and said bridge member includes means for reducing stress on the lead wires which occurs during a molding process.

11. The device according to claim 10, wherein said means for reducing the stress on the lead wires comprises a slot formed in said bridge member.

12. The device according to claim 11, wherein said means for reducing the stress on the lead wires further comprises a raised wire guide on said bridge member.

13. The device according to claim 1, wherein said body includes a slotted member.

14. The device according to claim 13, wherein a portion of said coil rests in a slot formed in said slotted member.

15. The device according to claim 1, wherein said body is disposed completely outside an opening in the coil.

16. The device according to claim 1, wherein said body surrounds a portion of the coil.

17. A swing-type actuator, comprising:
at least one arm;
a coil having a thickness, an inner circumference, an outer circumference and a plurality of lead wires;
a plurality of terminal pins attached to said lead wires;
means for locating said terminal pins relative to nsaid coil, said means including a body disposed adjacent said inner circumference of said coil, at least a portion of said body having a thickness which is less than the thickness of said coil, a plurality of terminal pin sleeves disposed about said terminal pins, and a bridge member connecting said body and said terminal pin sleeves; and
a thermoplastic hold member surrounding a portion of said at least one arm and said coil, a portion of said hold member being located adgacent said body and having a thickness equal to the difference in thickness between said body and said coil.

18. The actuator according to claim 17, further comprising means for locating said body in a mold during formation of said hold member.

19. The actuator according to claim 18, wherein said means for locating said body in a mold comprises at least one opening in said body.

20. The actuator according to claim 19, further including means for preventing the device from assuming a skewed orientation in the mold.

21. The actuator according to claim 20, wherein said means for preventing the device from assuming a skewed orientation in the mold comprises at least one structural feature formed in said body.

22. The actuator according to claim 21, wherein said structural feature is located between a surface of said body and a surface of said coil.

23. The actuator according to claim 22, wherein said structural feature comprises a projection and said portion of said hold member adjacent said body is flush with said projection.

24. The actuator according to claim 23, wherein an outer circumference of said body is smaller than the inner circumference of said coil.

25. The actuator according to claim 24, wherein said bridge member includes means for reducing stress on said lead wires which occurs while said hold member is molded.

26. The actuator according to claim 25, wherein said means for reducing stress on said lead wires comprises a slot in said bridge member.

27. The actuator according to claim 26, wherein said means for reducing stress on said lead wires further comprises a raised wire guide on said bridge member.

28. The actuator according to claim 27, wherein said body extends completely around the inner circumference of said coil.

29. A swing-type actuator for a disk drive, comprising:
an E-block for pivotally supporting a plurality of read/write heads;
a coil formed from a continuous length of wire having respective free ends;
a pair of terminal pins, each connected to a respective one of said free ends of said coil;
a body disposed adjacent said coil and having a pair of sleeves for receiving respective ones of said terminal pins; and
a hold member, disposed adjacent portions of said E-block, coil and body to secure the coil and body to the E-block.

* * * * *